United States Patent
Kim et al.

(10) Patent No.: US 9,893,778 B2
(45) Date of Patent: Feb. 13, 2018

(54) METHOD AND APPARATUS FOR TRANSRECEIVING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR); Hanbyul Seo, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/893,865

(22) PCT Filed: Jul. 25, 2014

(86) PCT No.: PCT/KR2014/006807
§ 371 (c)(1),
(2) Date: Nov. 24, 2015

(87) PCT Pub. No.: WO2015/012636
PCT Pub. Date: Jan. 29, 2015

(65) Prior Publication Data
US 2016/0112102 A1    Apr. 21, 2016

Related U.S. Application Data

(60) Provisional application No. 61/858,591, filed on Jul. 25, 2013.

(51) Int. Cl.
*H04B 7/04* (2017.01)
*H04B 7/0456* (2017.01)
(Continued)

(52) U.S. Cl.
CPC .......... *H04B 7/0456* (2013.01); *H04B 7/024* (2013.01); *H04B 7/0626* (2013.01);
(Continued)

(58) Field of Classification Search
CPC .... H04B 7/0456; H04B 7/024; H04B 7/0626; H04B 7/0632; H04B 7/0639; H04B 7/2656; H04W 72/042
See application file for complete search history.

(56) References Cited

U.S. PATENT DOCUMENTS

| 2012/0113951 A1* | 5/2012 | Koo | H04L 5/0048 370/329 |
| 2012/0243499 A1* | 9/2012 | Moon | H04L 5/001 370/329 |

(Continued)

FOREIGN PATENT DOCUMENTS

| WO | 2011/040773 | 4/2011 |
| WO | 2012/081843 | 6/2012 |
| WO | 2012/102479 | 8/2012 |

OTHER PUBLICATIONS

PCT International Application No. PCT/KR2014/006807, Written Opinion of the International Searching Authority dated Nov. 5, 2014, 16 pages.

(Continued)

*Primary Examiner* — Ajay Cattungal
(74) *Attorney, Agent, or Firm* — Lee Hong Degerman Kang & Waimey

(57) ABSTRACT

The present invention relates to a wireless communication system. A method for a terminal reporting channel state information in a wireless communication system, according to one embodiment of the present invention, comprises the steps of: receiving, from a second cell interfering with communication between a first cell and the terminal, a second precoding matrix indicator (PMI) determined based (Continued)

on the interference; and transmitting, to the first cell, the second PMI and a channel quality indicator (CQI).

12 Claims, 12 Drawing Sheets

(51) Int. Cl.
    *H04B 7/26*     (2006.01)
    *H04B 7/06*     (2006.01)
    *H04W 72/04*     (2009.01)
    *H04B 7/024*     (2017.01)

(52) U.S. Cl.
    CPC ......... *H04B 7/0632* (2013.01); *H04B 7/0639* (2013.01); *H04B 7/2656* (2013.01); *H04W 72/042* (2013.01)

(56) References Cited

U.S. PATENT DOCUMENTS

| | | | | |
|---|---|---|---|---|
| 2012/0327783 A1* | 12/2012 | Moon | ................... | H04L 1/1861 370/241 |
| 2013/0064193 A1* | 3/2013 | Moon | ................... | H04L 5/001 370/329 |
| 2013/0094466 A1* | 4/2013 | Kim | ................... | H04W 52/146 370/329 |
| 2013/0155969 A1* | 6/2013 | Moon | ................. | H04W 72/042 370/329 |
| 2014/0050191 A1* | 2/2014 | Kim | ........................ | H04L 5/001 370/329 |
| 2014/0133395 A1* | 5/2014 | Nam | .................... | H04B 7/0452 370/328 |
| 2014/0313985 A1* | 10/2014 | Nimbalker | .......... | H04L 27/0012 370/329 |
| 2015/0215905 A1* | 7/2015 | Park | ..................... | H04B 7/0473 370/329 |
| 2015/0312927 A1* | 10/2015 | Ko | ........................ | H04B 7/024 370/336 |
| 2016/0029395 A1* | 1/2016 | Kim | ....................... | H04J 11/004 370/329 |

OTHER PUBLICATIONS

Samsung, "CoMP Implicit CQI Feedback Discussions," 3GPP TSG RAN WG1 Meeting #57bis, R1-092654, Jun. 2009, 6 pages.
Samsung, "A feedback framework based on W2W1 for Rel. 10," 3GPP TSG RAN WG1 Meeting #61bis, R1-103664, Jun. 2010, 19 pages.
PCT International Application No. PCT/KR2014/006807, Written Opinion of the International Searching Authority dated Nov. 5, 2014, 11 pages.

* cited by examiner

FIG. 5
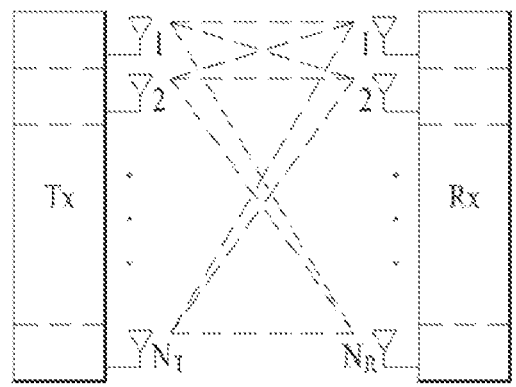
(a)
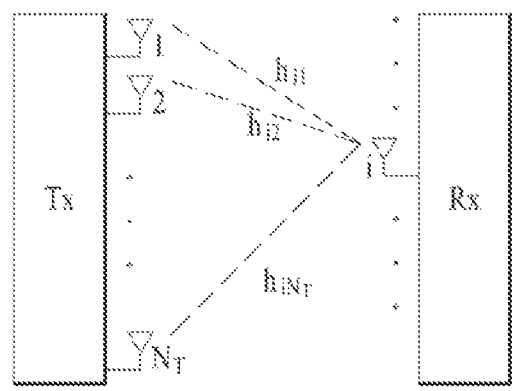
(b)

METHOD AND APPARATUS FOR TRANSRECEIVING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/006807, filed on Jul. 25, 2014, which claims the benefit of U.S. Provisional Application No. 61/858,591, filed on Jul. 25, 2013, the contents of which are all hereby incorporated by reference herein in their entirety.

TECHNICAL FIELD

The present invention relates to a wireless communication system, and more particularly, to a method for a user equipment to report channel state information by receiving, from a $2^{nd}$ cell causing interference to communication between a $1^{st}$ cell and the user equipment, a $2^{nd}$ PMI (precoding matrix indicator) determined based on the interference and transmitting the $2^{nd}$ PMI to the $1^{st}$ cell together with a CQI (channel quality indicator) and apparatus for the same.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Task

Based on the aforementioned discussion, an object of the present invention is to provide a method and device for transmitting and receiving channel state information in a wireless communication system.

Another technical task of the present invention is to provide a method and apparatus for reporting channel state information, by which UE is able to relay information necessary for coordination between base stations in case of a large backhaul delay in a wireless communication system supportive of cooperative transmission.

The technical objects that can be achieved through the present invention are not limited to what has been particularly described hereinabove and other technical objects not described herein will be more clearly understood by persons skilled in the art from the following detailed description.

Technical Solutions

In a 1st technical aspect of the present invention, provided herein is a method of reporting channel state information (CSI) by a user equipment in a wireless communication system, including the steps of receiving from a 2nd cell causing interference to communication between a 1st cell and the user equipment a 2nd PMI (precoding matrix indicator) determined based on the interference and transmitting the 2nd PMI and a CQI (channel quality indicator) to the 1st cell.

In a 2nd technical aspect of the present invention, provided herein is a user equipment, which reports channel state information (CSI) in a wireless communication system, including a radio frequency (RF) unit and a processor configured to receive from a 2nd cell causing interference to communication between a 1st cell and the user equipment a 2nd PMI (precoding matrix indicator) determined based on the interference and to transmit the 2nd PMI and a CQI (channel quality indicator) to the 1st cell.

The following matters may be included in the 1st and 2nd technical aspects of the present invention.

The method may further include the step of receiving DCI (downlink control information) including a 1-bit flag, wherein if the 1-bit flag corresponds to a 1st value, a remaining payload of the DCI may include the 2nd PMI and wherein if the 1-bit flag corresponds to a 2nd value, the remaining payload of the DCI may include scheduling information.

The CQI may be calculated based on a 1st CSI process of the 1st cell and a 2nd CSI process of the 2nd cell.

A same IMR (interference measurement resource) may be used in the 1st CSI process and the 2nd CSI process.

The 2nd PMI may be received through an EPDCCH (enhanced physical downlink control channel).

A CSI process used for feedback of the 2nd PMI may be determined using a state of PQI (PDSCH RE mapping and quasi co-location indicator) connected to a set of EPDCCHs of the 2nd cell.

After the 2nd PMI is received from the 2nd cell, the 2nd PMI is transmitted to the 1st cell through a first PUSCH (physical uplink shared channel).

Effects obtainable from the present invention are non-limited by the above mentioned effects. And, other unmentioned effects can be clearly understood from the following description by those having ordinary skill in the technical field to which the present invention pertains.

Advantageous Effects

According to the embodiment of the present invention, channel state information may be transmitted and received more efficiently in a wireless communication system.

According to an embodiment of the present invention, UE can relay information necessary for coordination between base stations in case that a backhaul delay in a wireless communication system supportive of cooperative transmission is large.

Channel state information can be transceived more efficiently.

It will be appreciated by persons skilled in the art that that the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas.

BEST MODE FOR INVENTION

Figure 1:
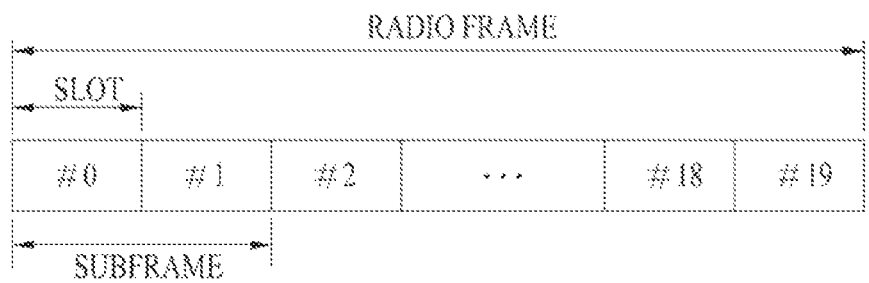
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
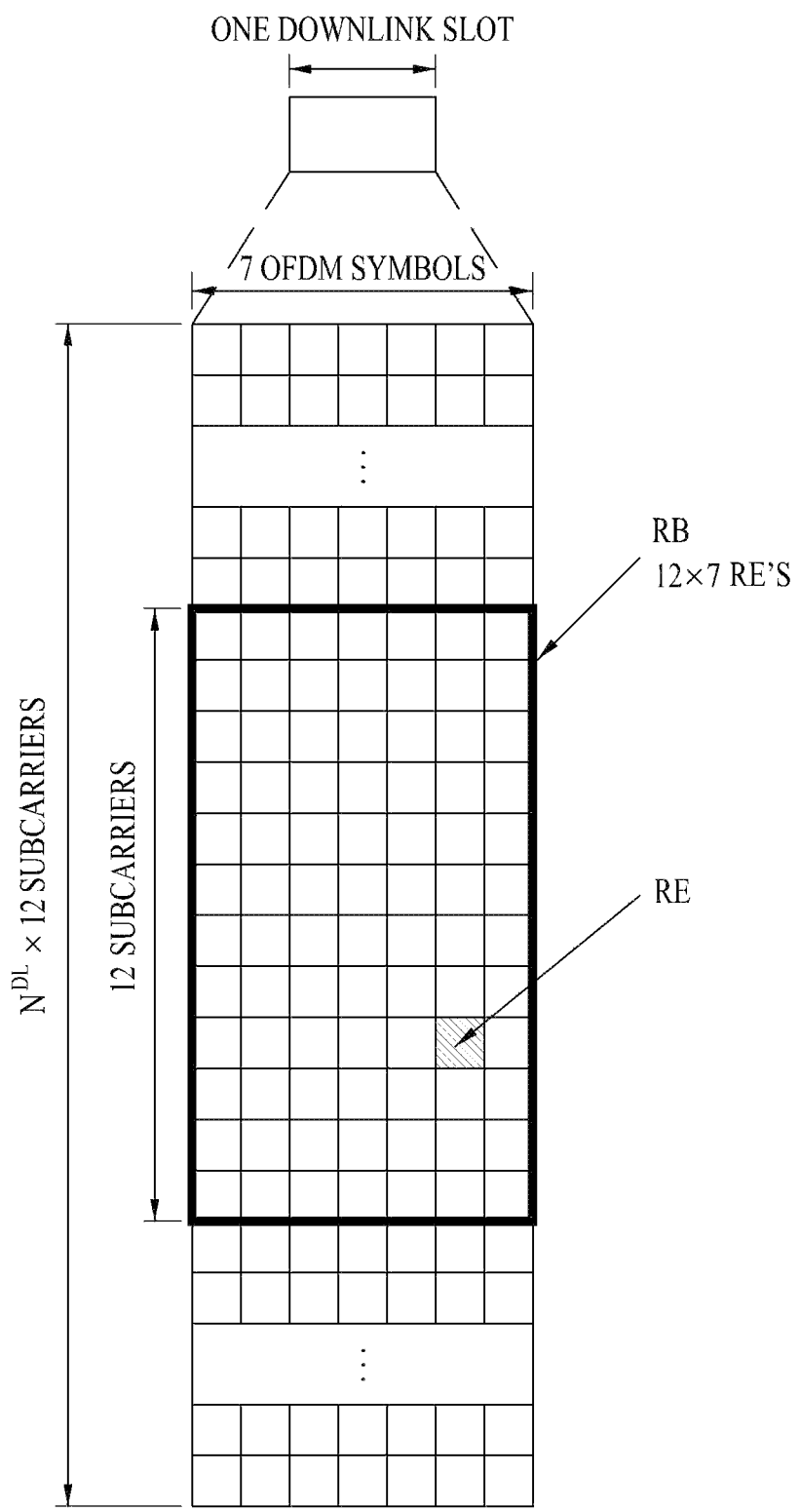
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
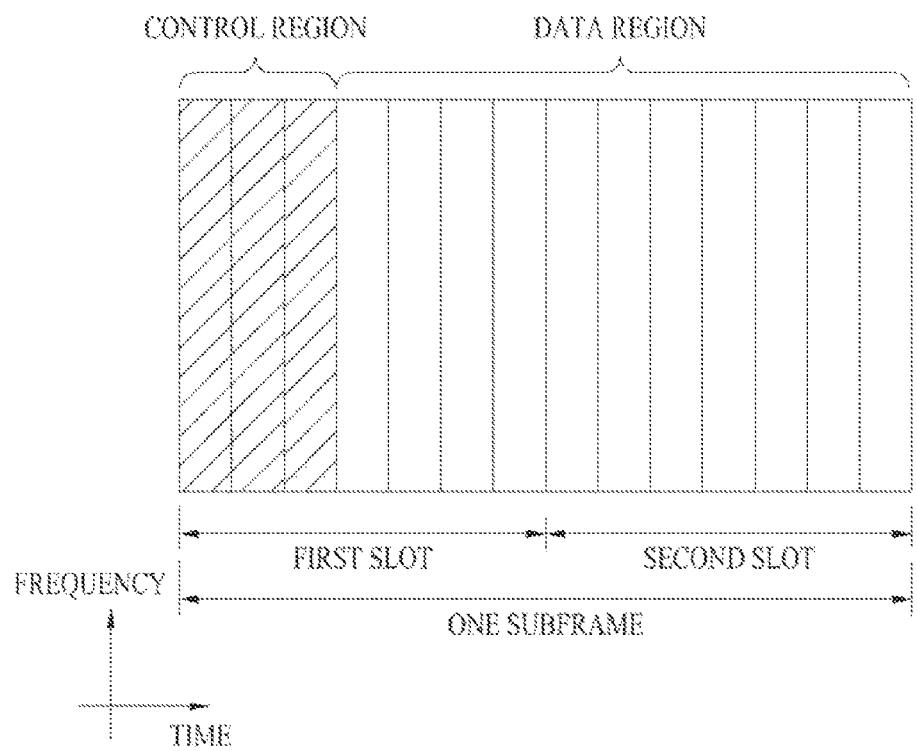
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
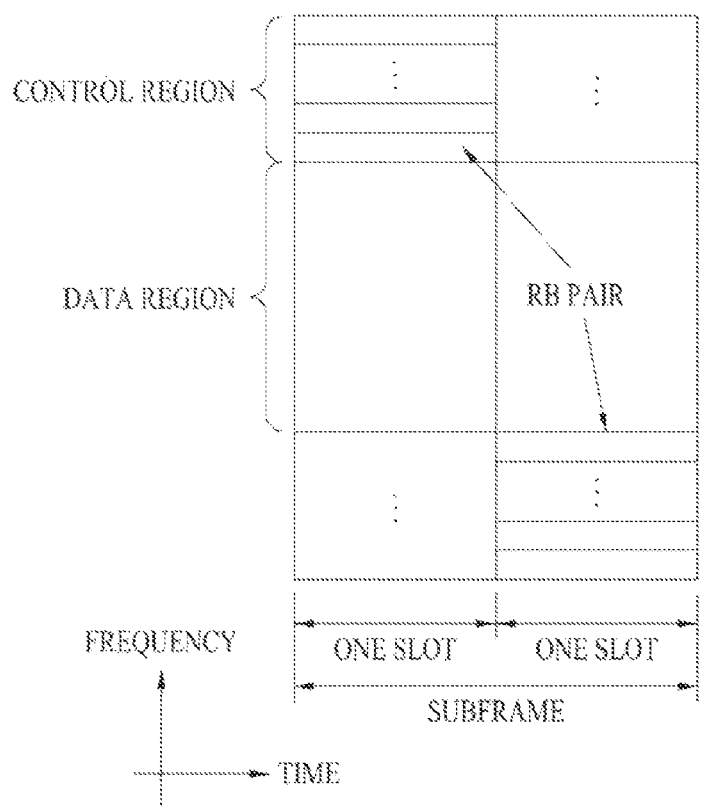
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

NT transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T \quad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}] \quad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n = [n_1, n_2, \ldots, n_{N_R}]^T \quad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
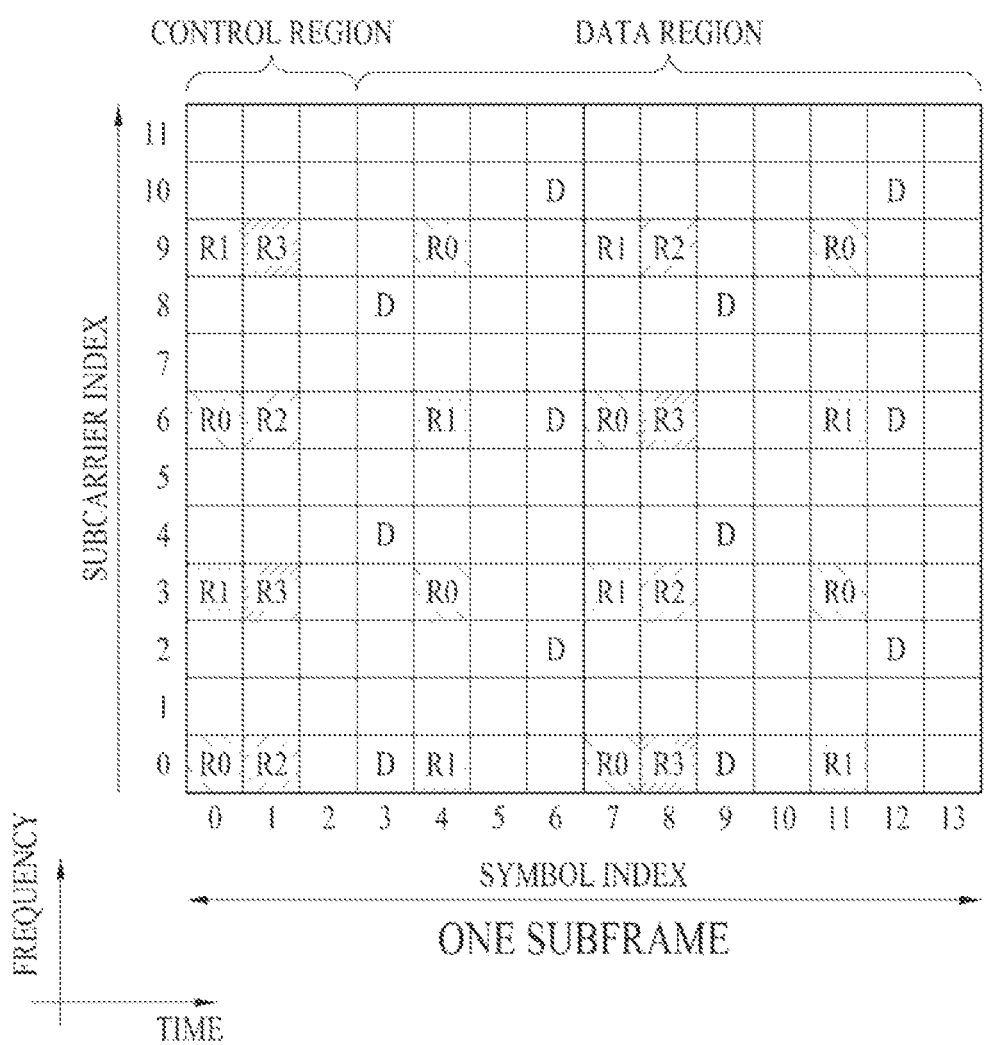
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'ID' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
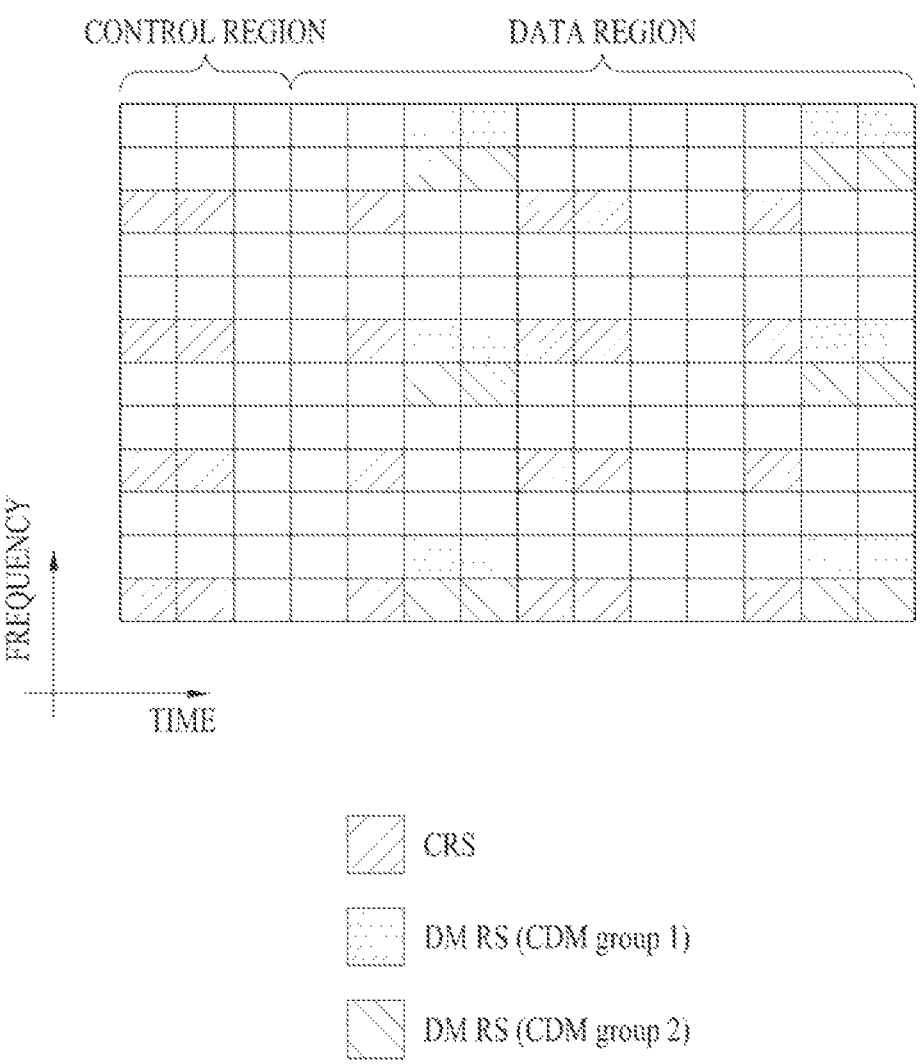
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
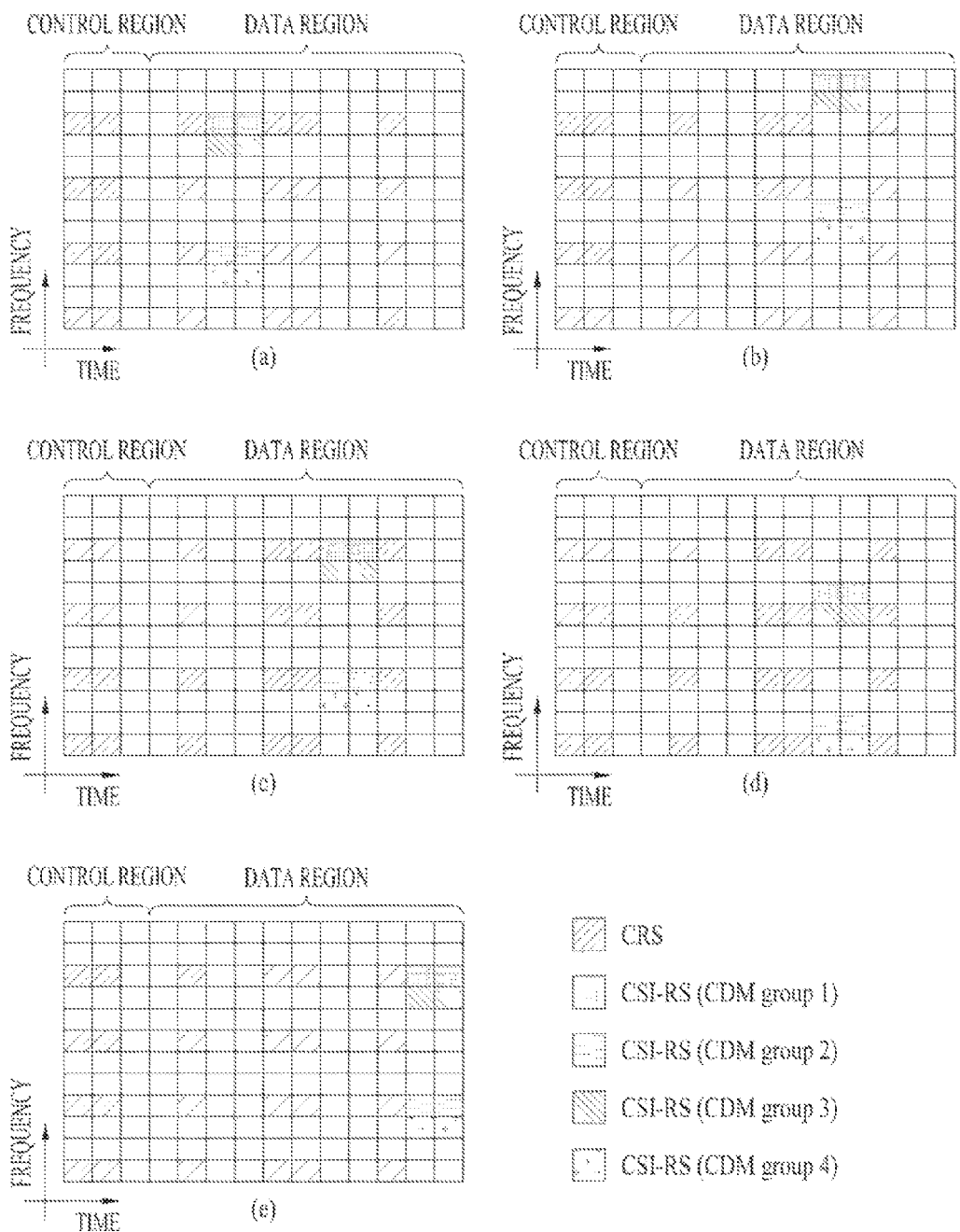
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
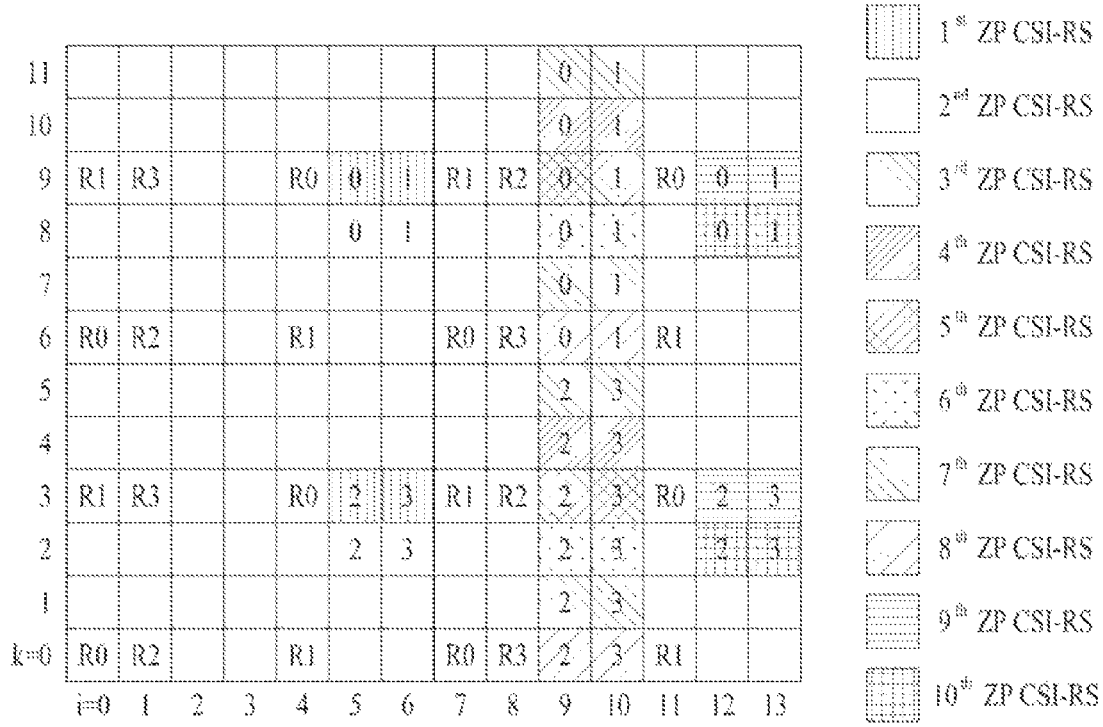
FIG. 9 is a diagram illustrating an example of a zero power (ZP) CSI-RS pattern.

FIG. 9 illustrates an example of a ZP (Zero Power) CSI-RS pattern, which is defined in the LTE-A system. The purpose of ZP CSI-RS is broadly divided into two purposes. A first purpose corresponds to a purpose for enhancing CSI-RS performance. More specifically, in order to enhance a CSI-RS measurement performance of another network, one network performs muting on a CSI-RS RE of the other network, and, then, in order to allow its own UE to be capable of correctly performing rate matching, the corresponding network may configure the muted RE to the ZP CSI-RS and may then notify such configuration. A second purpose corresponds to a purpose of performing interference measurement for CoMP CQI calculation. More specifically, part of the network performs muting on the ZP CRS-RS RE, and the UE may calculate the CoMP CQI by measuring the interference from this ZP CSI-RS.

The RS patterns illustrated in FIGS. 6, 7, 8 and 9 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative Multipoint Transmission/Reception (CoMP) System

CoMP (cooperative multipoint transmission/reception) is explained in the following description.

A system appearing after LTE-A has attempted to introduce a scheme of enhancing system performance by enabling a plurality of cells to cooperate with each other. Such a scheme is called a cooperative multipoint transmission/reception (hereinafter abbreviated CoMP). The CoMP refers to a scheme for two or more base stations, access points, or cells to cooperatively communicate with a specific user equipment for smooth communication between the user equipment and the base stations, the access points, or the cells. In the present invention, a base station, an access point, and a cell may have the same meaning.

In general, in a multi-cell environment having a frequency reuse factor set to 1, performance and average sector throughput of a user equipment located at a cell boundary may be lowered due to inter-cell interference (ICI). In order to reduce the ICI, a conventional LTE system has applied a method of providing an appropriate throughput performance to a user equipment located at a cell boundary in an environment restricted by interference using a simple manual scheme such as FFR (fractional frequency reuse) through UE-specific power control. However, reduction of the ICI or reuse of the ICI as a signal desired by a user equipment may be more preferable than lowering a frequency resource use per cell. In order to achieve the aforementioned purpose, the CoMP transmission scheme can be applied.

Figure 10:
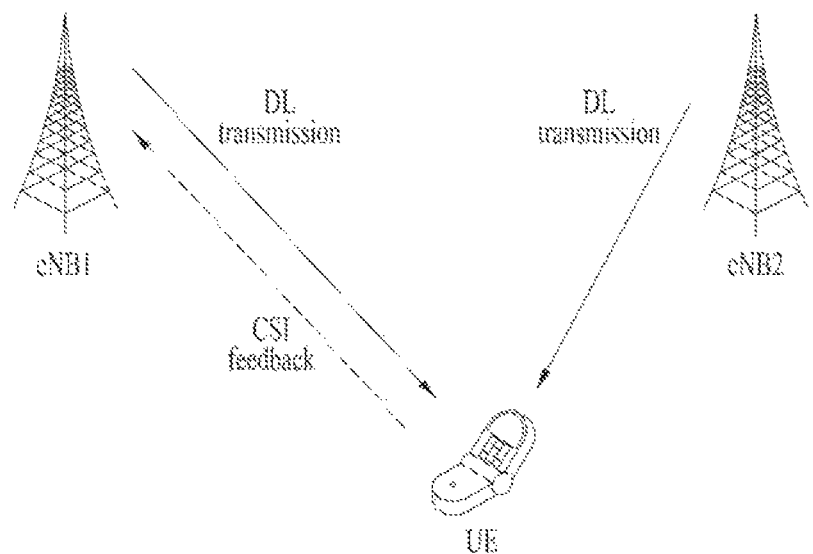
FIG. 10 is a diagram for one example of performing CoMP.

FIG. 10 is a diagram for one example of performing CoMP. Referring to FIG. 10, a wireless communication system includes a plurality of base stations (BS1, BS2 and BS3) performing CoMP and a user equipment. A plurality of the base stations (BS1, BS2 and BS3) performing the CoMP may efficiently transmit data to the user equipment by cooperating with each other.

The CoMP transmission scheme may be categorized into a join processing (CoMP-joint processing, CoMP-JP) scheme in the form of cooperative MIMO through data sharing and a coordinated scheduling/beamforming (CoMP-coordinated scheduling/beamforming, CoMP-CS/CB) scheme.

According to the joint processing (CoMP-JP) scheme in downlink, a user equipment may simultaneously receive data from a plurality of base stations performing the CoMP transmission scheme. And, a reception performance can be enhanced in a manner of combining signals received from the base stations (joint transmission (JT)). And, it is also possible to consider a method of transmitting data to a user equipment on a specific timing by one of the base stations performing the CoMP transmission scheme (dynamic point selection (DPS)). On the other hand, according to the coordinated scheduling/beamforming method (CoMP-CS/CB), a user equipment may instantaneously receive data from a single base station i.e., a serving base station through a beamforming According to the joint processing (CoMP-JP) scheme in uplink, a plurality of base stations may simultaneously receive PUSCH signal from a user equipment (joint reception (JR)). On the other hand, according to the coordinated scheduling/beamforming method (CoMP-CS/CB), only a single base station may receive the PUSCH. In this case, the decision to use the coordinated scheduling/beamforming scheme is determined by the coordinating cells (or base stations).

CSI Feedback in CoMP System

A user equipment using the CoMP transmission scheme, that is, a CoMP UE may provide feedback of channel information (hereinafter referred to as CSI feedback) to a plurality of base stations that perform the CoMP transmission scheme. A network scheduler may select an appropriate CoMP transmission scheme for enhancing a transmission rate from CoMP-JP, CoMP-CS/CB, and DPS schemes based on CSI feedback. To this end, as a method for a CoMP UE to configure CSI feedback for a plurality of base stations that perform a CoMP transmission scheme, a periodic feedback transmission scheme using uplink PUCCH may be used. In this case, feedback configurations for the respective base stations may be independent from each other. Accordingly, according to an embodiment of the present invention, throughout this specification, a feedback operation of channel information using the independent feedback configuration is referred to as a CSI process. One or more CSI processes may exist in one serving cell.

FIG. 10 is a diagram for one example of performing CoMP.

Referring to FIG. 10, UE is located between eNB 1 and eNB 2 and two eNBs (i.e., eNB 1 and eNB 2) perform appropriate CoMP operations such as JT, DCS and CS/CB to solve a problem of interference caused to the corresponding UE. The UE performs appropriate CSI feedback to assist CoMP operations of the eNBs (base stations). Information transmitted through CSI feedback includes PMI information and CQI information of each eNB and may additionally include channel information (e.g., phase offset information between channels of the two eNBs) between the two eNBs for JT.

In FIG. 10, although the UE transmits a CSI feedback signal to the eNB 1 corresponding to its serving cell, the UE may transmit the CSI feedback signal to the eNB 2 or to both of the two eNBs depending on situations. Moreover, although in FIG. 10, eNB is described as a basic unit for joining CoMP, a transmission point controlled by eNB may become the basic unit for the CoMP as well.

For CoMP scheduling in a network, UE should provide feedback of downlink CSI of a neighbor eNB, which participates in the CoMP, as well as DL CSI of a serving eNB. To this end, the UE needs to provide feedback of a plurality of CSI processes, which reflect various eNBs for data transmission and various interference environments.

Thus, an interference measurement resource (IMR) is used for interference measurement during a CoMP CSI calculation in LTE system. A plurality of IMRs may be configured for one UE, and one UE has independent configuration for each of the IMRs. In particular, period, offset and resource configuration of each IMR are independently configured and a base station may signal to UE through high layer signaling such as RRC (radio resource control) signaling or the like.

Moreover, in the LTE system, CSI-RS is used for measurement for a desired channel during the CoMP CSI calculation. A plurality of CSI-RSs may be configured for one UE and each of the CSI-RSs has independent configuration. In particular, period, offset, resource configuration, power control (PC), and the number of antenna ports of each CSI-RS are independently configured. And, information related to CSI-RS may be signaled from a base station to UE through high layer signaling (e.g., RRC, etc.).

One CSI process is defined in a manner of associating one CSI-RS resource for signal measurement with one IMR (interference measurement resource) for interference measurement among a plurality of the CSI-RSs and IMRs, which are configured for the UE. Each CSI derived from different CSI processes is fed back by the UE based on an independent period and subframe offset.

In particular, each CSI process has independent CSI feedback configuration. Information on the association of the CSI-RS resource and the IMR resource, CSI feedback configuration and the like may be informed UE by a base station in each CSI process through high layer signaling such as RRC. For example, it is assumed that three CSI processes are configured for UE as shown in Table 1.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 represent CSI-RS received from the eNB 1 corresponding to a serving base station (serving eNB) of the UE and CSI-RS received from the eNB 2 corresponding to a neighbor eNB participating in cooperation, respectively. It is assumed that IMR configured for each CSI process of Table 1 is configured as illustrated in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

On IMR 0, the eNB 1 performs muting, the eNB 2 performs data transmission, and the UE is configured to measure interference from different eNBs except the eNB 1. Likewise, on IMR 1, the eNB 2 performs muting, the eNB 1 performs data transmission, and the UE is configured to measure interference from different eNBs except the eNB 2. Also, on IMR 2, both of the eNB 1 and the eNB 2 perform muting and the UE is configured to measure interference from different eNBs except both of the eNB 1 and the eNB 2.

Therefore, as shown in Table 1 and Table 2, CSI of CSI process 0 represents optimized RI, PMI and CQI information in the case of receiving data from the eNB 1. CSI of CSI process 1 represents optimized RI, PMI and CQI information in the case of receiving data from the eNB 2. CSI of CSI process 2 represents optimized RI, PMI and CQI information in the case that data is received from the eNB 1 and that there is no interference from the eNB 2.

Feedback of Interference Information in CoMP System

If a backhaul link delay between multiple TPs participating in cooperative transmission is large, it is difficult to perform dynamic cooperative transmission between the TPs. In other words, when the backhaul link delay is large, it takes a long time to initiate the cooperative transmission and it is difficult to respond to a channel state of the cooperative transmission immediately.

For instance, it is preferable that an interference TP performs muting at a specific timing. However, if the cooperative transmission is initiated after a long delay, CoMP gain is not large in spite of muting of the interference TP. In other words, a timing optimized for CoMP is missed due to channel aging caused by the time delay.

As mentioned in the foregoing description, the backhaul delay may have a critical effect on performance of the CoMP. Thus, proposed in this specification is a method for UE to relay information necessary for coordination between base stations in case of a large backhaul delay. According to the present invention, it is advantageous in that information sharing between base stations can be performed rapidly and that sufficient CoMP performance can be obtained even if a backhaul delay is large.

Moreover, although the features of the present invention are described with reference to an example of CB (coordinated beamforming), the present invention may be applied to other CoMP schemes. Moreover, the present invention may be used for a random information exchange scheme between two base stations. Although contents of information relayed by UE is assumed to correspond to CSI, the present invention is not limited thereto.

Figure 11:
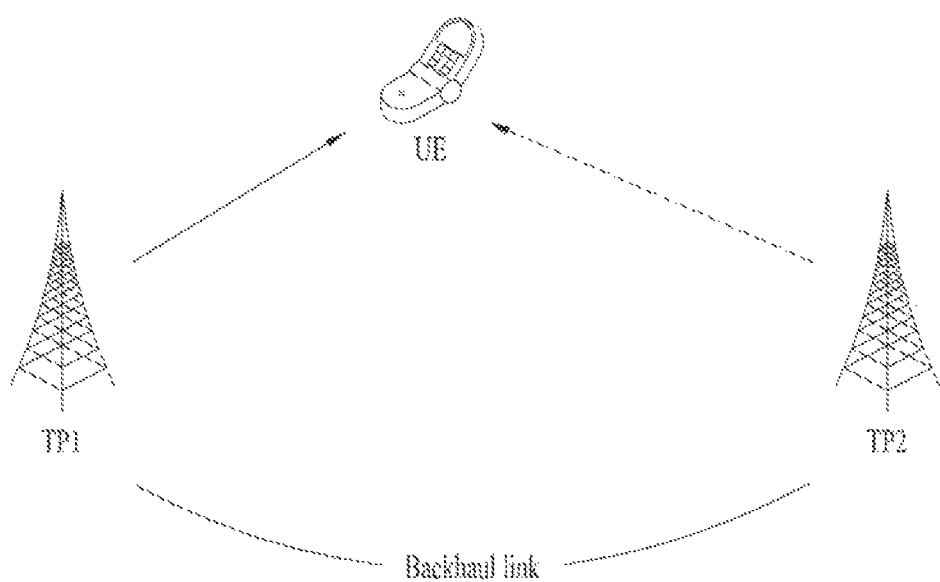
FIG. 11 is a diagram for one example of a CB (coordinated beamforming) situation.

FIG. 11 is a diagram for one example of a CB (coordinated beamforming) situation.

Referring to FIG. 11, TP 1 is serving TP of UE and neighbor TP 2 causes interference to the UE. The TP 1 and TP 2 are connected to each other through backhaul of which a delay is tens to hundreds of ms. The TP 2 uses fixed precoding on a specific frequency-time resource promised between base stations. This precoding usually exists in a region in which non-dominant right singular vectors of a downlink channel between the TP 2 and UE are spanned.

Figure 12:
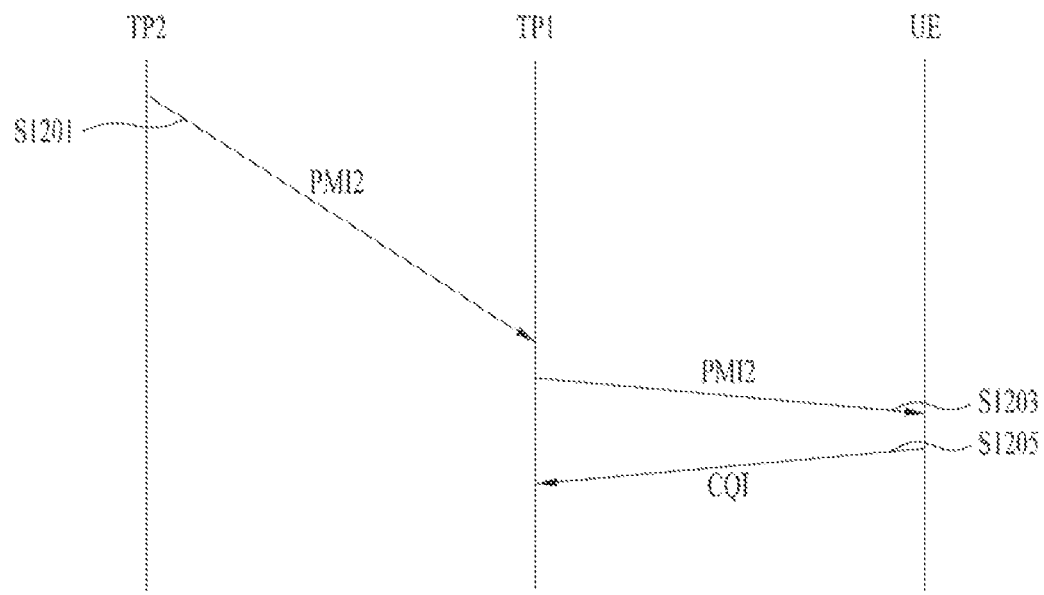
FIG. 12 is a diagram of a general information exchange process between TP 1, TP 2 and UE in case of performing CB as shown in FIG. 11.

FIG. 12 is a diagram of a general information exchange process between TP 1, TP 2 and UE in case of performing CB as shown in FIG. 11.

First of all, the TP 2 determines PMI 2 corresponding to a precoding value of the TP 2 [S1201]. The PMI 2 is determined as a direction orthogonal to PMI between the TP 2 and UE or a direction having a low correlation to eliminate interference efficiently. The TP 2 transmits the PMI 2 to the TP 1 through backhaul.

Having received the PMI 2, the TP 1 forwards the PMI 2 to the UE through PDCCH [S1203].

Having received the PMI 2, the UE generates an interference effective channel by multiplying the PMI 2 and a channel measured from CSI-RS of the TP 2. Subsequently, the UE calculates SINR and CQI, in which interference from the TP 2 is reflected, based on the interference effective channel and then transmits the calculated CQI to the TP 1 [S1205].

The TP 1 determines an MCS level based on the CQI received from the UE and performs downlink data scheduling.

If a backhaul delay for sharing the PMI2 in the entire process is significantly large, performance of CB may be degraded due to the delay.

1st Embodiment

Figure 13:
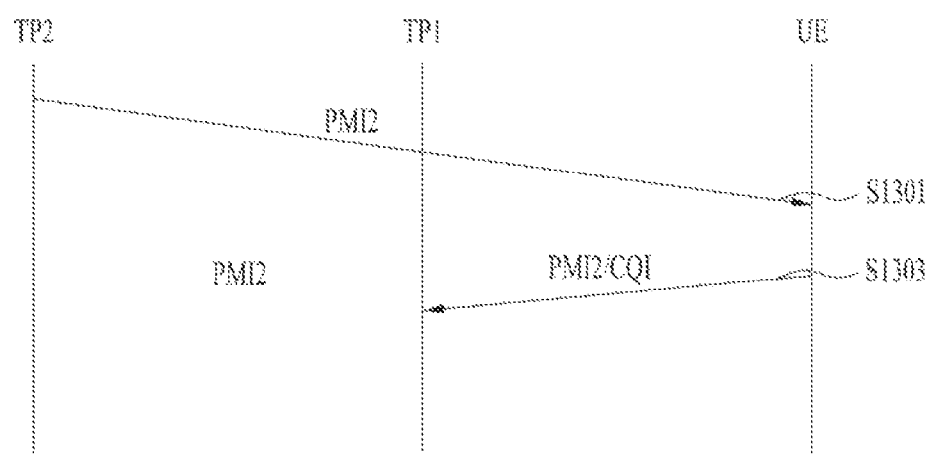
FIG. 13 is a diagram for a $1^{st}$ embodiment of the present invention.

A 1st embodiment of the present invention is designed to solve the problem mentioned in the foregoing description with reference to FIG. 12 and a signal transmission method shown in FIG. 13 can be applied thereto.

First of all, TP 2 transmits PMI 2 to UE through a control channel [S1301].

In this case, since TP 1 corresponds to a serving TP of the UE, it may be difficult to establish PDCCH between the UE and the TP 2. Thus, the control channel may become EPDCCH. The UE receives the PMI 2 from the TP 2 by performing blind decoding (BD) on the EPDCCH. For instance, it may be configured that EPDCCH set 0 is used in the TP 1 and that EPDCCH set 1 is used in the TP 2, exclusively. And, the UE may detect the PMI 2 from the set 1 in the course of performing BD.

If EPDCCH is used for a specific purpose such as information sharing for CoMP between TPs as mentioned in the foregoing description, it is preferred to adjust EPDCCH candidates of each EPDCCH set.

For example, if DCI for transmitting the above-mentioned PMI 2 is named DCI format 2E, scheduling flexibility of serving TP may be enhanced in a manner of considering part of DCI including the DCI 2E as EPDCCH candidates in the case of the set 1 and defining more EPDCCH candidates in the case of the set 0.

Likewise, if only a part of aggregation levels is limitedly used in the set 1, the EPDCCH candidates of the set 1 may be reduced. For instance, considering the fact that a CoMP UE has a high probability of being located at a cell edge, the TP 2 may transmit EPDCCH of the set 1 using only a high aggregation level such as aggregation level 8 among whole aggregation levels.

Alternatively, EPDCCH candidates in each EPDCCH set may vary periodically. For example, in case of a normal subframe, 22 EPDCCH candidates are equally configured for the EPDCCH set 0 and the EPDCCH set 1. And, candidates in the set 0 and candidates in the set 1 may be operated based on a period of 5 ms in an asymmetrical manner. For instance, only the DCI 2E and a specific aggregation level may be used based on the period of 5 ms in the set 1 and more than 22 EPDCCH candidates may be configured for the set 0. It is also possible that only the EPDCCH set 0 is used in the normal subframe and both of the set 0 and set 1 may be used in the subframe, which appears at every period of 5 ms. In this case, the TP 2 transmits the PMI 2 in the subframe appearing at every period of 5 ms through the set 2.

The adjustment of the EPDCCH candidates in the EPDCCH set should be previously promised between TPs. Thus, such information may be transmitted by serving TP to UE through high layer signaling such as RRC or the like.

In order for the TP 2 to efficiently transmit the PMI 2, new DCI may be defined. In particular, 1 bit flag is assigned to a DCI field. And, if the flag is enabled, all remaining payloads of DCI is predefined as PMI 2 information. If the flag is disabled, the rest of the payloads may be filled with different information such as PDSCH scheduling or the like.

Thereafter, the UE calculates CSI using the PMI 2 and then feeds back to the TP 1 [S1303].

In this case, the CSI calculation may be performed according to one of two schemes in the following description.

According to a first scheme of calculating CSI, CSI is calculated through a CSI process in which CSI-RS of the TP 2 is used.

In particular, according to the first scheme, both a CSI process of the TP 1 and a CSI process of the TP 2 are used. To this end, a base station configures at least two CSI processes for the UE. CSI-RS of the TP1 is used for the CSI process 1 and CSI-RS of the TP 2 is used for CSI process 2.

In order for the base station to facilitate UE's recalculation of CB-applied CQI, the same IMR without interference from the TP 1 and TP 2 is used for both of the process 1 and process 2.

The UE does not calculate PMI of the process 2 but fixes it to the PMI 2. CQI is determined with reference to SINR obtainable when the TP 2 transmits data using the PMI 2 as a precoder. Since a rank of the PMI 2 should be equal to the rank, which is previously fed back through the CSI process 2 by the UE, the TP 1 and TP 2 previously define the rank of the PMI 2. And, the TP 1 limits the rank of the corresponding CSI process 2 to the rank predefined through codebook subset restriction.

Having received the CSI of the process 2 from the UE, the TP 1 recalculates CQI when the TP 2 uses the PMI 2, using the CSI of the process 2 together with the CQI of the process 1.

In the above-mentioned scheme, the UE and TP 1 should previously define the CSI process, which is used for feedback of the PMI 2.

To this end, a PQI state connected to the EPDCCH set, in which the PMI 2 is transmitted, of the TP 2 may be used. The UE uses quasi-collocation (QCL) information for EPDCCH decoding and each EPDCCH set is previously connected to one among PQI 4 states, which include QCL information. For instance, the PMI 2 is transmitted through the EPDCCH set 1, the set 1 is connected to a $2^{nd}$ PQI state, and CSI-RS 2 transmitted from the TP 2 is connected to the $2^{nd}$ PQI state. The UE detects a CSI process using the CSI-RS 2 from a plurality of configured CSI processes and then feeds the PMI 2 and CQI back. If there are several CSI processes using the CSI-RS 2, the UE selects a CSI process having a lowest CSI process index from the several CSI processes. Of course, such a process is currently targeted to only a CSI process configured for a carrier component to which CoMP is applied.

Alternatively, the TP may simply determine a CSI process used for feedback of the PMI 2 for the UE.

The base station needs to discriminate whether the PMI 2 transmitted through the CSI process 2 corresponds to a value relayed by the TP 2 or best PMI of a channel between the TP 2 and UE. To this end, the UE adds new 1 bit flag to the CSI process 2 and informs the base station of it through feedback. If the flag is enabled, the PMI transmitted through the process 2 means PMI 2 relayed from the TP 2. And, if the flag is disabled, the PMI transmitted through the process 2 means the best PMI of the channel between the TP 2 and UE, which is calculated according to the conventional scheme.

According to a second scheme of calculating CSI, the PMI 2 is not reported and the CSI process 1 is used only. Particularly, the UE generates an interference effective channel by multiplying a channel measured from the CSI-RS of the TP 2 and then calculates SINR and CQI, in which interference from the TP 2 is reflected, based on the interference effective channel. The TP 1 configures the CSI process 1 for the UE using the CSI-RS of the TP 1 and IMR without interference from the TP 2. The UE feeds CQI back through the above process. In the above CQI, the channel measured from the CSI-RS of the TP 1 is assumed to be a desired channel. And, the CQI is calculated in a manner of adding interference measured through the IMR to an interference size of the calculated interference effective channel. The TP 1 perform data scheduling for the UE with reference to CSI of the process 1.

Even if the TP 1 does not know the PMI 2, the TP 1 may perform CB according to the second CSI calculation scheme. However, if the TP 1 knows the PMI 2, the TP 1 may perform more flexible scheduling.

For instance, if a different UE in the TP 1 feeds information on a channel with the TP 2 back, an interference effective channel is generated in a manner of multiplying the corresponding channel by the PMI 2. And, a precoder may be determined so that the interference effective channel is orthogonal to a desired effective channel of the different UE. To this end, the TP 1 should know the desired channel and interference channel instead of PMI for the desired channel and PMI for the interference channel in addition. Thus, the UE provides feedback of the two channels to the TP 1 by quantizing them or provides feedback of a reception beamforming vector together with PMI in order for the base station to recalculate the two channel.

As another example, if a different UE in the TP 1 feeds information on a channel with the TP 2 back, the TP 1 may perform CoMP scheduling using the PMI 2. The TP 1 may determine scheduling for the UE by comparing PMI (hereinafter referred to as PMI 2a) in the information on the channel with the TP 2, which is fed back by the different UE, and the PMI 2. For instance, if the PMI 2a and PMI 2 are highly correlated, the TP 2 may cause large interference to UE. Thus, it is preferred not to perform scheduling for the corresponding UE. On the contrary, if the PMI 2a and PMI 2 are lowly correlated, the TP 2 may cause small interference to UE, whereby it is preferred to perform scheduling for the corresponding UE.

If feedback of the PMI 2 is necessary, the PMI 2 is fed back through an uplink channel different from that used for the CSI of the CSI process 1.

As a first PMI 2 feedback method, after receiving PMI 2, UE transmits the PMI 2 through PUSCH opened first. In particular, having received the PMI 2, the UE transmits the PMI 2 with respect to first received UL grant of the TP 1. In this case, it may be promised between a base station and UE that the PMI 2 is transmitted together with PUSCH data to be originally transmitted or only the PMI 2 is transmitted instead of the PUSCH data. A high layer header may be added for the base station to discriminate whether a value transmitted by the UE corresponds to UL data or the PMI 2 after receiving the PUSCH. For instance, the UE may inform the base station whether the PMI 2 is transmitted in a manner of adding 1 bit flag to an MAC layer header.

$2^{nd}$ Embodiment

According to a $2^{nd}$ embodiment of the present invention, TP 2 transmits PMI 2 to both UE and TP 1. In particular, the PMI 2 is determined by an interference cell according to the $2^{nd}$ embodiment.

Figure 14:
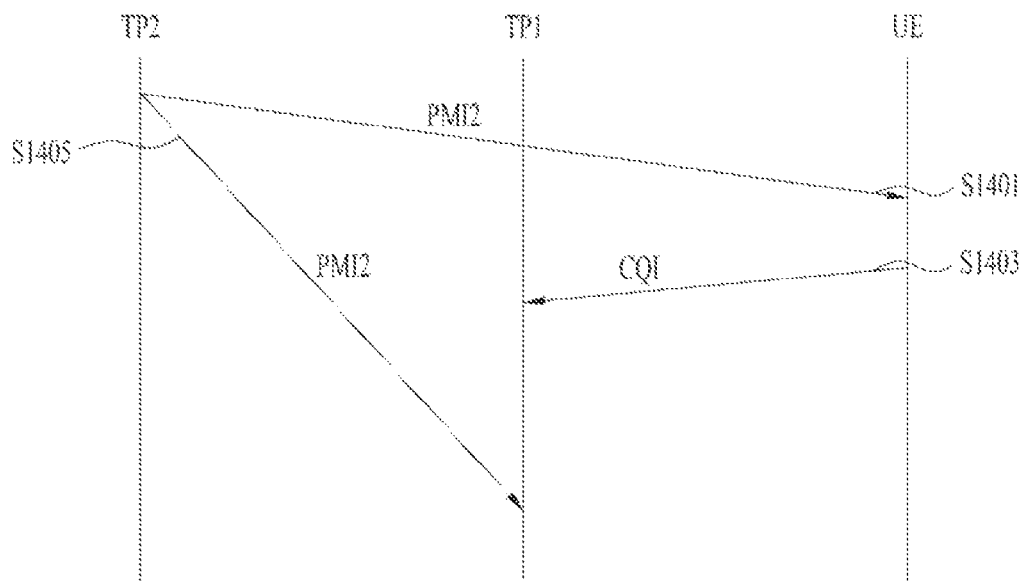
FIG. 14 is a diagram of a $2^{nd}$ embodiment according to the present invention.

FIG. 14 is a diagram of a $2^{nd}$ embodiment according to the present invention.

Similar to the $1^{st}$ embodiment, PMI 2 is transmitted from TP 2 to UE [S1401]. In this case, CQI is calculated according to the second CQI calculation method in the $1^{st}$ embodiment. The UE transmits the calculated CQI to the TP 1 [S1403]. Unlike the 1st embodiment, in preparation for the case that the PMI 2 needs to be transmitted to the TP 1, the PMI 2 is transmitted to both of the TP 1 and the UE [S1405]. However, since the PMI 2 transmitted to the TP 1 is transmitted through a backhaul link, it has a large delay. In FIG. 14, the TP 1 does not know which beamforming is used by the TP 2 to perform CB from a time at which CQI is received until receiving the PMI 2. Moreover, in some cases, the TP 1 does not even know whether the TP 2 performs CB. However, although the TP 1 is not aware of whether the TP 2 performs CB, the TP 1 receives feedback of CQI in which effects of the CB is reflected from the UE, a data transfer rate may be enhanced.

$3^{rd}$ Embodiment

According to the $2^{nd}$ embodiment, the TP 2 determines the PMI 2 and shares the determined PMI 2 with the UE and TP 1. On the contrary, according to a $3^{rd}$ embodiment, the TP 1 determines the PMI 2 and shares the determined PMI 2 with the TP 2 and UE.

Figure 15:
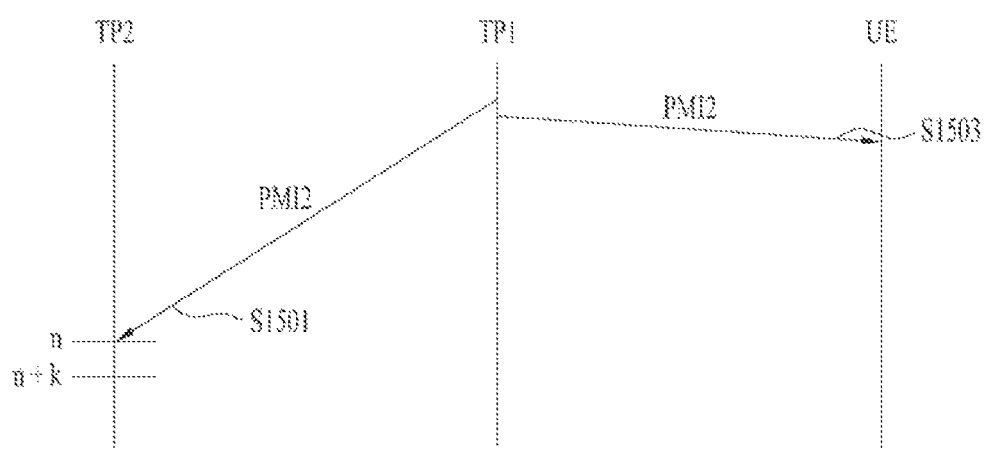
FIG. 15 is a diagram of a conventional scheme for TP 1 to determine PMI 2 and share a value of the PMI2.

FIG. 15 is a diagram of a conventional scheme for TP 1 to determine PMI 2 and share a value of the PMI2. Referring to FIG. 15, TP 1 transmits PMI 2 to TP 2 [S1501] and then transmits the PMI 2 to UE as well [S1503]. It takes a long time for the TP 2 to receive the PMI 2 due to a large backhaul delay, compared to the UE. Having received the PMI 2 at n time, the TP 2 performs precoding on the PMI 2 from (n+k) time, which is previously promised with the TP 1. In this case, the frequency domain to which the PMI 2 is applied may be previously defined. Alternatively, such resource information may be shared through backhaul together with the PMI 2.

Figure 16:
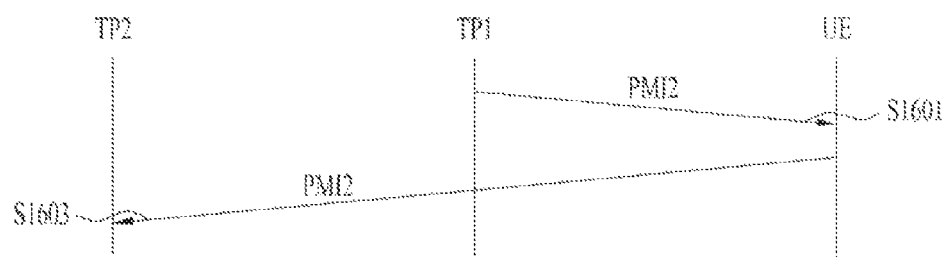
FIG. 16 is a diagram of a $3^{rd}$ embodiment according to the present invention.

FIG. 16 is a diagram of a $3^{rd}$ embodiment according to the present invention.

According to a $3^{rd}$ embodiment of the present invention, PMI 2 may be transmitted to TP 2 rapidly. TP 1 informs UE of the PMI 2 through a control channel [S1601]. To this end, new DCI may be defined. For instance, 1 bit flag is assigned to a DCI field. And, if the flag is enabled, all remaining payloads of DCI is set as PMI 2 information. If the flag is disabled, the rest of the payload may be set as information such as PDSCH scheduling or the like.

Subsequently, the UE transmits the PMI 2 to the TP 2 [S1603]. For instance, having received the PMI 2, the UE transmits the PMI 2 with respect to first received UL grant of the TP 2. Alternatively, a channel between the UE and TP 2 is defined with respect to a specific frequency-time resource of PUCCH/PUSCH and the UE may transmit the PMI 2 using the channel. Moreover, a part of a PRACH preamble is defined for usage of PMI 2 transmission and the UE may inform the TP 2 of the PMI 2 by transmitting the PRACH preamble. For instance, if the PMI 2 is quantized as one of total 16 types, it may operates by performing one-to-one mapping on 16 preambles among preambles with the PMI 2. Further, one predetermined PRACH preamble may be used for usage of a UL grant trigger. For example, if the UE transmits PRACH preambles to the TP 2 10 times, the TP 2 provides UL grant to the UE. And, the UE transmits the PMI 2 through scheduled PUSCH. In this case, the UE transmits PUSCH DMRS using one of two RRC-configured PUSCH virtual cell IDs and the TP may previously indicate to the UE which virtual cell ID is used.

Figure 17:
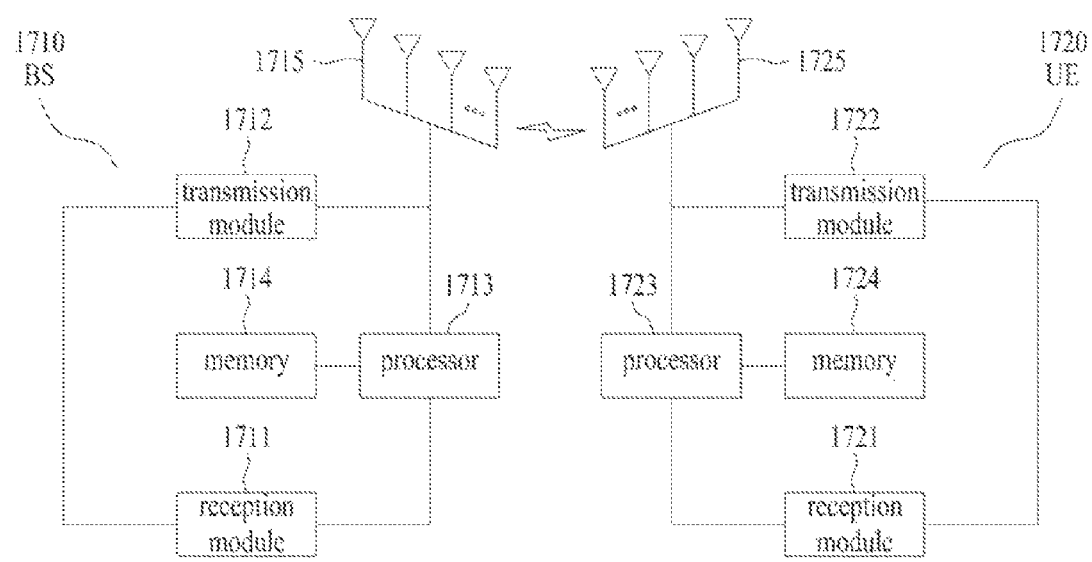
FIG. 17 is a diagram for examples of a base station and a user equipment applicable to one embodiment of the present invention.

FIG. 17 is a diagram for examples of a base station and a user equipment applicable to one embodiment of the present invention.

If a relay node is included in a wireless communication system, communication in backhaul link is performed between a base station and the relay node and communication in access link is performed between the relay node and a user equipment. Therefore, the base station or user equipment shown in the drawing can be substituted with the relay node in some cases.

Referring to FIG. 17, a wireless communication system includes a base station 1710 and a user equipment 1720. The base station 1710 includes a processor 1713, a memory 1714 and an RF (radio frequency) unit 1711 and 1712. The processor 1713 can be configured to implement the procedures and/or methods proposed by the present invention. The memory 1714 is connected to the processor 1713 and stores various kinds of informations related to operations of the processor 1713. The RF unit 1716 is connected to the processor 1713 and transmits and/or receives radio or wireless signals. The user equipment 1720 includes a processor 1723, a memory 1724 and an RF unit 1721 and 1722. The processor 1723 can be configured to implement the procedures and/or methods proposed by the present invention. The memory 1724 is connected to the processor 1723 and stores various kinds of informations related to operations of the processor 1723. The RF unit 1721 and 1722 is connected to the processor 1723 and transmits and/or receives radio or wireless signals. The base station 1710 and/or the user equipment 1720 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforementioned embodiments of the present invention can be used by those skilled in the art in a manner of being combined with each other. Therefore, the present invention is non-limited by the embodiments disclosed herein but intends to give a broadest scope that matches the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The present invention can be applied to various wireless communication devices including a user equipment, a relay, a base station and the like.

What is claimed is:

1. A method of reporting a channel state information (CSI) by a user equipment in a wireless communication system, the method comprising:
    receiving a DCI (downlink control information) including a 1-bit flag;
    receiving, from a $2^{nd}$ cell causing interference to communication between a $1^{st}$ cell and the user equipment, a $2^{nd}$ PMI (precoding matrix indicator) determined based on the interference; and
    transmitting the $2^{nd}$ PMI and a CQI (channel quality indicator) to the $1^{st}$ cell;
    wherein if the 1-bit flag corresponds to a $1^{st}$ value, a remaining payload of the DCI comprises the $2^{nd}$ PMI, and
    wherein if the 1-bit flag corresponds to a $2^{nd}$ value, the remaining payload of the DCI comprises scheduling information.

2. The method of claim 1,
    wherein the CQI is calculated based on a $1^{st}$ CSI process of the $1^{st}$ cell and a $2^{nd}$ CSI process of the $2^{nd}$ cell.

3. The method of claim 2,
    wherein a same IMR (interference measurement resource) is used in the $1^{st}$ CSI process and the $2^{nd}$ CSI process.

4. The method of claim 1,
    wherein the $2^{nd}$ PMI is received through an EPDCCH (enhanced physical downlink control channel).

5. The method of claim 4,
wherein a CSI process used for feedback of the $2^{nd}$ PMI is determined using a state of PQI (PDSCH RE mapping and quasi co-location indicator) connected to a set of EPDCCHs of the $2^{nd}$ cell.

6. The method of claim 1,
wherein, after the $2^{nd}$ PMI is received from the $2^{nd}$ cell, the $2^{nd}$ PMI is transmitted to the $1^{st}$ cell through a first PUSCH (physical uplink shared channel).

7. A user equipment for reporting a channel state information (CSI) in a wireless communication system, a user equipment comprising:
a radio frequency (RF) unit; and
a processor,
wherein the processor is configured to:
control the RF unit to receive a DCI (downlink control information) including a 1-bit flag,
control the RF unit to receive, from a $2^{nd}$ cell causing interference to communication between a $1^{st}$ cell and the user equipment, a $2^{nd}$ PMI (precoding matrix indicator) determined based on the interference,
control the RF unit to transmit the $2^{nd}$ PMI and a CQI (channel quality indicator) to the $1^{st}$ cell
wherein if the 1-bit flag corresponds to a $1^{st}$ value, a remaining payload of the DCI comprises the $2^{nd}$ PMI, and
wherein if the 1-bit flag corresponds to a $2^{nd}$ value, the remaining payload of the DCI comprises scheduling information.

8. The user equipment of claim 7,
wherein the CQI is calculated based on a $1^{st}$ CSI process of the $1^{st}$ cell and a $2^{nd}$ CSI process of the $2^{nd}$ cell.

9. The user equipment of claim 8,
wherein a same IMR (interference measurement resource) is used in the $1^{st}$ CSI process and the $2^{nd}$ CSI process.

10. The user equipment of claim 7,
wherein the $2^{nd}$ PMI is received through an EPDCCH (enhanced physical downlink control channel).

11. The user equipment of claim 10,
wherein a CSI process used for feedback of the $2^{nd}$ PMI is determined using a state of PQI (PDSCH RE mapping and quasi co-location indicator) connected to a set of EPDCCHs of the $2^{nd}$ cell.

12. The user equipment of claim 7,
wherein, after the $2^{nd}$ PMI is received from the $2^{nd}$ cell, the $2^{nd}$ PMI is transmitted to the $1^{st}$ cell through a first PUSCH (physical uplink shared channel).

\* \* \* \* \*